United States Patent
Corkery et al.

(10) Patent No.: US 10,758,891 B2
(45) Date of Patent: Sep. 1, 2020

(54) PHOTOCATALYTIC PARTICLE COMPRISING TIO2 AND ITS MANUFACTURE

(71) Applicant: Joma International AS, Nyborg (NO)

(72) Inventors: Robert Corkery, Stockholm (SE); Andreas Westermoen, Frekhaug (NO)

(73) Assignee: JOMA INTERNATIONAL AS, Nyborg (NO)

(*) Notice: Subject to any disclaimer, the term of this patent is extended or adjusted under 35 U.S.C. 154(b) by 199 days.

(21) Appl. No.: 15/735,083

(22) PCT Filed: Jun. 13, 2016

(86) PCT No.: PCT/EP2016/063478
§ 371 (c)(1),
(2) Date: Dec. 8, 2017

(87) PCT Pub. No.: WO2016/198689
PCT Pub. Date: Dec. 15, 2016

(65) Prior Publication Data
US 2019/0344244 A1    Nov. 14, 2019

(30) Foreign Application Priority Data
Jun. 12, 2015 (SE) ........................... 1550806

(51) Int. Cl.
*B01J 21/06* (2006.01)
*B01J 35/00* (2006.01)
(Continued)

(52) U.S. Cl.
CPC .......... *B01J 21/063* (2013.01); *B01J 35/004* (2013.01); *B01J 35/006* (2013.01);
(Continued)

(58) Field of Classification Search
CPC .... B01J 21/063; B01J 35/0013; B01J 35/004; B01J 35/006; B01J 35/026; B01J 37/009; B01J 37/031; B01J 37/08
See application file for complete search history.

(56) References Cited

U.S. PATENT DOCUMENTS
2010/0234209 A1   9/2010  Furukawa et al.

FOREIGN PATENT DOCUMENTS
WO   2014/118371 A1   8/2014
WO   2014/118372 A1   8/2014

OTHER PUBLICATIONS

Yen et al (Chain-network anatase/TiO2 (B) thin film with improved catalytic efficiency, Nanotech, 25 (2014), 235602, pp. 1-7) (Year: 2014).*
(Continued)

Primary Examiner — Patricia L. Hailey
Assistant Examiner — Michael Forrest
(74) Attorney, Agent, or Firm — Porter Wright Morris & Arthur LLP

(57) ABSTRACT

A $TiO_2$ photocatalytic particle comprises at least one core with a crystalline anatase structure, a first layer is at least partly surrounding the core, and comprising one from $TiO_2$, $TiO_{(2-x)}$, and $TiO_2*H_2O$, said first partly ordered layer comprising parts where molecules are aligned with an imaginary extension of the crystal planes of the core, the first layer is in close contact with a second outer layer, at least partly enclosing the first layer and the core. The second layer comprises one from layered titanium dioxide and titanium dioxide in $TiO_2$ (B)-form, said second layer is partly ordered, and said second layer comprising sheets aligned with crystal planes transversal to the outer surface of said particle. Advantages include that the outer layer of the particles can be modified to be optimized for the particular
(Continued)

application which is an advantage for catalysis and other application where the properties of the outermost surface is of importance.

29 Claims, 5 Drawing Sheets

(51) Int. Cl.
  *B01J 35/02* (2006.01)
  *B01J 37/00* (2006.01)
  *B01J 37/03* (2006.01)
  *B01J 37/08* (2006.01)
(52) U.S. Cl.
  CPC ......... *B01J 35/0013* (2013.01); *B01J 35/026* (2013.01); *B01J 37/009* (2013.01); *B01J 37/031* (2013.01); *B01J 37/08* (2013.01); *B01D 2255/20707* (2013.01); *B01D 2255/802* (2013.01)

(56) References Cited

OTHER PUBLICATIONS

Dai et al (Enhanced visible-light photocatalytic activity for selective oxidation of amines into imines over TiO2 (B)/anatase mixed-phase nanowires, Appl. Surf. Sci. 349 (2015) 343-352) (Year: 2015).*

Beuvier et al., Accurate Methods for Quantifying the Relative Ratio of Anatase and TiO2(B) Nanoparticles, J. Phys. Chem. C, 113:13703-13706 (2009).

Feist et al., The Soft Chemical Synthesis of TiO2(B) from Layered Titanates, Journal of Solid State Chemistry, 101(2):275-295 (1992).

Xue et al., Facile synthesis of mesoporous core-shell TiO2 nanostructures from TiCl3, Materials Research Bulletin, 46 (9):1524-1529 (2011).

Cui et al., Fabrication of Tunable Core—Shell Structured TiO2 Mesoporous Microspheres Using Linear Polymer Polyethylene Glycol as Templates, J. Phys. Chem. C 2010, 114(6):2434-2439 (2010).

Marchand et al., TiO2(B) A New Form of Titanium Dioxide and the Potassium Octatitanate K2Ti8O17, Mat. Res. Bull., 15(8):1129-1133 (1980).

Yan et al., One-pot synthesis of bicrystalline titanium dioxide spheres with a core-shell structure as anode materials for lithium and sodium ion batteries, Journal of Power Sources, 269:37-45 (Jul. 7, 2014).

Chen et al., Synthesis, Features, and Applications of Mesoporous Titania with TiO2(B), Chinese Journal of Catalysis, vol. 31, Issue 6, pp. 605-614 (2010).

Xu et al., Novel core-shell structured mesoporous titania microspheres: Preparation, characterization and excellent photocatalytic activity in phenol abatement, Journal of Photochemistry and Photobiology A:Chemistry 195(2-3):284-294 (2008).

Marc Estruga et al., Low-temperature and ambient-pressure sythesis of TiO2(B), Materials Letters, 64(21):2357-2359 (2010).

Demirors et al, Seeded Growth of Titania Colloids with Refractive Index Tunability and Fluorophore-Free Luminescence, Langmuir, 27(5):1626-1634 (2011).

Li et al, Highly Thermal Stable and Highly Crystalline Anatase TiO2 for Photocatalysis, Environ. Sci. Technol. 43:5423-5428 (2009).

* cited by examiner

PHOTOCATALYTIC PARTICLE COMPRISING TIO2 AND ITS MANUFACTURE

TECHNICAL FIELD

The present invention relates generally to a metastable photocatalytic particles comprising $TiO_2$ and comprising at least one crystalline core and a first and a second at least partially surrounding layers with specific structures.

BACKGROUND

Particles including photocatalytic particles comprising $TiO_2$ are widely used within many different applications. $TiO_2$ particles are well known and well-studied.

Kumar and Rao in Nanoscale 2014, vol 6, pp 11574-11632 is a review article about phase transitions in titania ($TiO_2$).

Materials Research Bulletin, Volume 15, Issue 8, August 1980, Pages 1129-1133 discloses $TiO_2$ (B), a new form of titanium dioxide.

Journal of Solid State Chemistry, Volume 101, Issue 2, December 1992, Pages 275-295 discloses chemical synthesis of $TiO_2$ (B) from layered titanates.

Materials Letters, Volume 64, Issue 21, 15 November 2010, Pages 2357-2359 discloses one way of making $TiO_2$ (B).

Andrews et al in JAGS 2014, vol 136, pp 6306-6312 is concerned with the shape of $TiO_2$ B nanoparticles.

Beuvier et al in J. Phys. Chem. 2009, vol 113, pp 13703-13706 describes a method of quantifying the ratio of anatase and $TiO_2$ (B) in $TiO_2$ nanoparticles.

The international standard for assessing the air purification performance of $TiO_2$-functionalized surfaces is ISO 22917-1:2007.

US2010234209 discloses a nano-particle comprising: a core of a size having a first electrically conducting or semiconducting material, a shell of a thickness having a second dielectric or semiconducting material, wherein the composition of said second material is different from the composition of said first material, and wherein the shell thickness is less than or equal to the core size.

$TiO_2$ particles are utilized for many different purposes. One field of use if photocatalysis.

Regarding the $TiO_2$ particles according to the state of the art it is desirable to improve their photo-catalytic activity, not least regarding removal of NOx.

Regarding other fields of use it is desired to optimize the particles with respect to adhesion and dispersion stability etc.

SUMMARY

It is an object of the present invention to obviate at least some of the disadvantages in the prior art and provide an improved photocatalytic particle comprising $TiO_2$.

In a first aspect there is provided a photocatalytic particle comprising at least one core, said core comprising $TiO_2$ and said at least one core having a crystal structure with crystal planes, said at least one core comprises anatase, said at least one core being in close contact with a first layer, said first layer is at least partly surrounding said at least one core, said first layer comprising at least one selected from the group consisting of $TiO_2$, $TiO_{(2-x)}$, and $TiO_2*H_2O$, said first layer is partly ordered, said first layer comprising parts where molecules are aligned with an imaginary extension of the crystal planes of said at least one core, wherein said first layer is in close contact with a second layer, said second layer is an outer layer, said second layer is at least partly enclosing said first layer including said at least one core, said second layer comprising at least one selected from the group consisting of layered titanium dioxide and titanium dioxide in $TiO_2$ (B)-form, said second layer is partly ordered, and said second layer comprising sheets aligned with crystal planes transversal to the outer surface of said particle.

In a second aspect there is provided a method of manufacturing a photocatalytic particle, said method comprising the steps of:
a) providing at least one titanic acid with the general formula $[TiO_x(OH)_{4-2x}]_n$ and soluble in at least one selected from the group consisting of $TiOCl_2$, $TiCl_4$, and HCl, and dissolving it in a solution comprising at least one selected from the group consisting of $TiOCl_2$, $TiCl_4$, and HCl, wherein the pH of the solution is lower than 1,
b) optionally adding at least one crystal habit modifier,
c) heating to a temperature in the interval 68-85° C., wherein the heating is performed with at least 0.3° C./min,
d) holding the temperature in the temperature 68-85° C. interval during 1-180 minutes, during stirring,
e) cooling to obtain a dispersion comprising particles with at least one core, said at least one core comprising anatase, and said at least one core having a crystal structure with crystal planes, said at least one core being in close contact with a first layer, said first layer is at least partly surrounding said at least one core, said first layer comprising at least one selected from the group consisting of $TiO_2$, $TiO_{(2-x)}$, and $TiO_2*H_2O$, said first layer is partly ordered, said first layer comprising parts where molecules are aligned with an imaginary extension of the crystal planes of said at least one core,
f) treating the dispersion to increase or decrease the content of ions, and adjusting the pH to a value in the range from 0.5 to 2.5, in order to add to the particles a second layer comprising at least one selected from the group consisting of layered titanium dioxide, and titanium dioxide in $TiO_2$ (B)-form, said second layer is partly ordered, and said second layer comprising sheets aligned with crystal planes transversal to the outer surface of said particle.

Further embodiments are defined in the appended claims, which are specifically incorporated herein by reference.

An advantage is that the surface properties of the photocatalytic particles become different because of the second layer. This is important both for catalytic applications and for other applications where the surface properties of the particles are different.

One advantage is that it is possible to tune the amount or thickness of the second outer layer in relation to the first layer and the core. Thus the surface properties can be fine-tuned.

BRIEF DESCRIPTION OF THE DRAWINGS

The invention is now described, by way of example, with reference to the accompanying drawings, in which.

DETAILED DESCRIPTION

Figure 1:
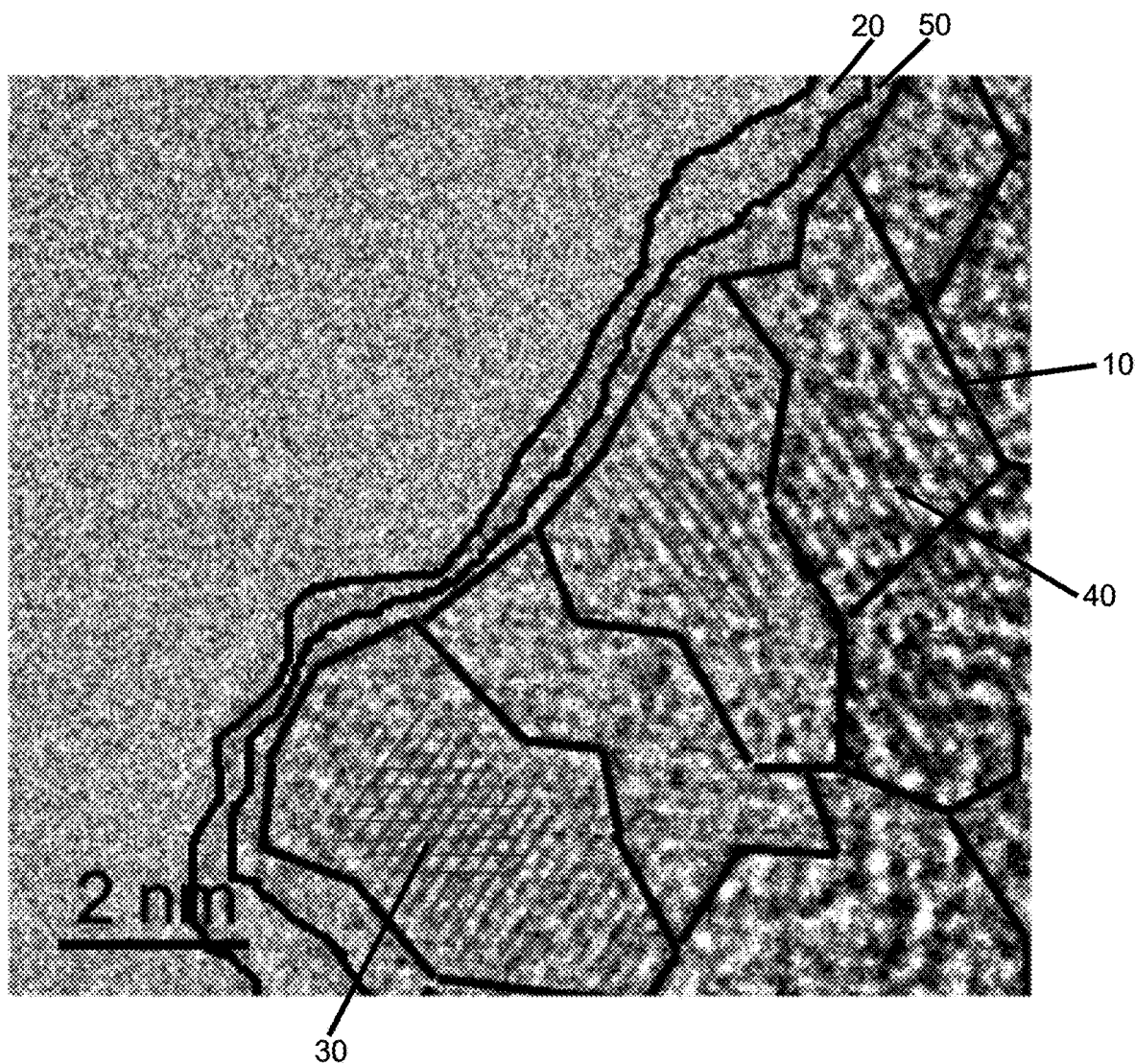
FIG. 1 shows an electron micrograph. Thick black lines 10 represent approximate locations of the boundaries of overlapping, ordered anatase crystalline regions. The area 20 between the black lines represents the outer layered titania skin. Lattice planes indicated by the fine black lines 30 in the bottom left domain correspond to Miller planes of index: (015) and/or (121) with interplanar spacings of 1.65-1.73 Å determined from Fourier transforming the real space TEM images. The Miller planes in the other domains 40 correspond to (020) planes (1.87-1.96 Å) and (011) planes (3.45-3.64 Å) of anatase. The area 50 between the black lines represents the region where the underlying anatase crystals are disordered, as judged by the lack of visible Miller planes. In some crystallites, this disordered state could be recognized by the distorted Miller planes at the crystal edges, see FIG. 2.

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

A crystal habit modifier is used to stop growth of nanoparticles and stabilize them from aggregation. Sometimes this is also referred to as a capping agent.

A dispersion as used herein refers to a system in which particles are dispersed in a continuous phase of a different composition. The term dispersion includes but is not limited to suspensions, colloids, and sols.

Without wishing to be bound by any particular scientific theory the inventors believe that the catalytic action of the photocatalytic particles on the substrate surface can be described as a three-step process, in particular for particles comprising at least one core and a surrounding gas permeable disordered titania containing layer. In the first step, the pollutant or compound to be reacted, for instance NO or NO2 is adsorbed to the surrounding layer. In the second step, an electron-hole pair is generated within the crystalline core and diffuses to the surface where it reacts with water/oxygen to form free radicals. In the third step, diffusion brings the radical and the pollutant in contact so that the wanted reaction can occur. A good photocatalytic particle should thus have a surface or surrounding layer where the compound to be reacted is adsorbed efficiently, however such a layer should not be too thick.

Electron/hole pairs (created by the light) are formed in the core(s) and may recombine unless for example reacting with water or oxygen. Long distances or obstacles such as grain boundaries, core-shell boundaries and non-crystalline layers, increase the chance of recombination. Free radicals will react with the desired pollutants or any other organic molecule they encounter first. There is a clear advantage in adding a layer which efficiently and preferentially adsorbs the desired pollutants close to where radicals are formed.

In one case the OH-groups in the non-crystalline layer can actually be the basis for OH radicals that are formed on the core/layer boundary. In this picture, the chance of electron-hole recombination is smaller.

In the case of micro- or mesoporous layers, diffusion of species is affected by absorption kinetics and other mobility parameters. To be suitable for photocatalysis, the relevant radicals and/or pollutants must percolate the layer.

For the specific purpose of NOx remediation, a photocatalytic particle with high radical formation rate but poor adsorption of $NO_2$ can achieve higher NO to $NO_2$ conversion rates than the $NO_2$ to $NO_3$ conversion rate, leading to an accumulation of $NO_2$ despite a net NOx reduction. For ambient air purification, it is therefore preferable to have a photocatalyst particle with a comparatively high $NO_2$ to $NO_3$ conversion, for example achieved by a high preferential $NO_2$ adsorption.

Figure 3:
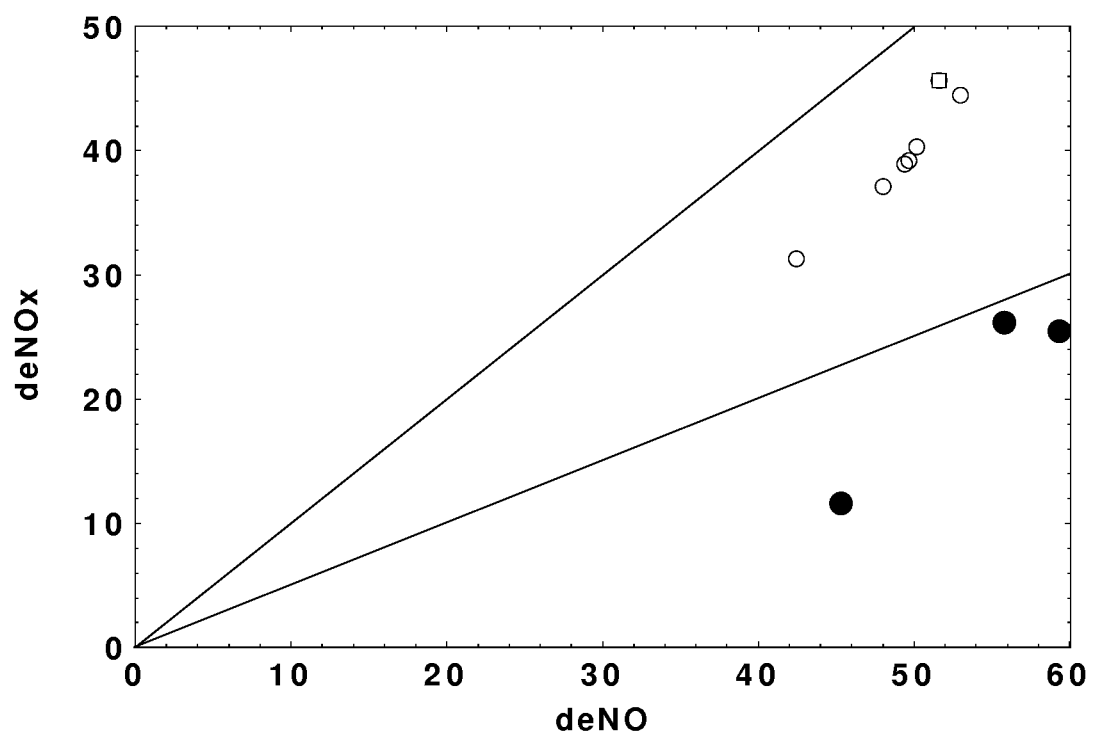
FIG. 3 discloses experimental results from powders made according to the method disclosed in the example compared to a competitor's product. The particles manufactured according to the examples give a product with demonstrably superior performance in degrading NOx under ISO-22197 conditions. Graph of deNO versus deNOx under ISO conditions. Open circles are powders made according to the claimed method as described in the example. Open square is a powder made according to the claimed method with heating to 250° C. for 18 hours in air. The black circles are Evonik P25, Millenium PC500 and Tayca.

Referring to FIG. 3 showing improved degradation of NOx and without wishing to be bound by any particular theory, the inventors believe this is because the surface has a comparatively higher preferential adsorption of $NO_2$. This in turn can be attributed to the second outer layer is an outer layer, comprising at least one selected from the group consisting of layered titanium dioxide and titanium dioxide in $TiO_2$ (B)-form, and comprising crystal planes transversal to the outer surface of said particle.

For idealized crystalline $TiO_2$ particles the electron/hole (created by the light) is formed in the core and have to find water/air on the surface before it recombines. Long distance or obstacles (grain boundaries, core-shell boundaries, non-crystalline layers etc.) decreases the chance of success. Water/air reacted to free radicals (on the surface) will react with pollutants or anything else they encounter first. The advantage of having a layer which adsorbs pollutant is clear, however the layer should not be too thick.

In one case the OH-groups in the non-crystalline layer can actually be the basis for OH radicals, and be formed inside the layer and thus have to be transported out. In this picture, OH-groups perform double duty both to help adsorb other species and also acting as absorbed water. A thick layer is still a disadvantage but the charge might not have to reach all the way to the outer surface.

The feature with several surrounding layers is suitable in order to modify the properties of the surface of the particle. Regarding photo-catalytic purposes the ability to capture pollutants such as NO and $NO_2$ is increased. At the same time the outer layer must not be too thick since this may slow down the reaction. It has turned out that the present structure provides an improved outer surface which improves photocatalytic properties of the particles. The OH-group density is increased which is a benefit not only for photocatalysis but also for more general adhesion and dispersion stability of the particles.

It is important to note that the particles are not thermodynamically stable. Instead they are thermodynamically metastable. The particles thus have a long lived configuration other than the system's state of least energy. During a metastable state of finite lifetime all state-describing parameters reach and hold stationary values. Typically the present particles are stable (i.e. metastable) for years at normal room temperature (about 25° C.). Stability over several years is sufficient for most applications. When stored at temperatures above several hundred degrees, such as above 200-300° C. for extended periods, the structure will change.

In a first aspect there is provided a photocatalytic particle comprising at least one core, said core comprising $TiO_2$ and said at least one core having a crystal structure with crystal planes, said at least one core comprises anatase, said at least one core being in close contact with a first layer, said first layer is at least partly surrounding said at least one core, said first layer comprising at least one selected from the group consisting of $TiO_2$, $TiO_{(2-x)}$, and $TiO_2*H_2O$, said first layer is partly ordered, said first layer comprising parts where molecules are aligned with an imaginary extension of the crystal planes of said at least one core, wherein said first layer is in close contact with a second layer, said second layer is an outer layer, said second layer is at least partly enclosing said first layer including said at least one core, second layer comprising at least one selected from the group consisting of layered titanium dioxide and titanium dioxide in $TiO_2$ (B)-form, said second layer is partly ordered, and said second layer comprising sheets aligned with crystal planes transversal to the outer surface of said particle.

The relative orientation of the bronze or layered titania phase (i.e. the second layer) does not or only rarely forms an epitaxial relationship with the underlying or temporally earlier anatase phases. In this sense the second layer is predominantly structured so that the normal to the layers of the said bronze or titanate is nearly parallel, on average for a given coated secondary particle, to the surface normal of the particle as defined by a vector starting at the center of gravity of the particle and exiting the particle on the surface of the particle. Nearly parallel is interpreted so that a deviation of ±10° can still be parallel.

The core comprises crystals of $TiO_2$ and the crystals are thus highly ordered. The core may comprise one or several crystals of $TiO_2$. In the first layer there is some degree of order but not as ordered as in a crystal. In the first layer the molecules are ordered in the same way and in the same pattern as in the crystal, at least in some areas and in particular close to the crystal surface. In the ordered crystal different crystal planes can be defined. The molecules in at least some parts of the first layer are aligned along at least some of the crystal planes as in the crystal. Thus one can imagine that a crystal plane extends out from the crystal and forms an imaginary plane, along which the molecules in some parts of the first layer are aligned. The order in the first layer only applies to some parts of the layer and in particular to areas close to the crystal surface. The crystal planes refers to any crystal planes in the core. This defines that the first layer has a certain degree of order, but it is not as ordered as in a crystal.

In one embodiment the first layer is completely surrounding the core.

In one embodiment the second layer is completely surrounding the first layer and the core.

The second layer is ordered to some extent and comprises flat sheet formed structures. It is possible to define crystal planes aligned with the sheets in the second layer. In the particles there are crystal planes aligned with sheets in the second layer (i.e. the sheets or layers of the structures) and the crystal planes are transverse compared to the surface of the particle. The second layer comprises $TiO_2$ in B-phase which comprises planar structures. The second layer does not consist entirely of such planar structure, i.e. sheets, but they can be seen for instance in micrographs.

In one embodiment the thickness of said first layer is from 0.2 to 20 nm. In another embodiment the thickness of said first layer is from 0.4 to 5 nm.

In one embodiment the thickness of said second layer is from 0.2 to 40 nm. In another embodiment the thickness of said second layer is from 0.3 to 10 nm.

In one embodiment the photocatalytic particle comprises at least one selected from the group consisting of citric acid, a citrate, and a reaction product from a chemical reaction involving citric acid.

In one embodiment of the first aspect the photocatalytic particle has been subjected to post-treatment at a temperature of 200-300° C. during 10-20 hours. The post-treatment is carried out after drying of the manufactured particles.

In one embodiment the photocatalytic particle comprises at least one crystallite with a Scherrer crystallite size in the range 5.0-7.5 nm before any optional post-treatment. The Scherrer crystal size is defined by the Scherrer equation, where XRD input data is the wavelength of the radiation (Cu Kα), FWHM of the (011) peak of anatase, the instrumental broadening, the 2theta position of the peak maxima and B=0.9 for the shape factor.

In one embodiment the photocatalytic particle has a NOx/NO selectivity above 60% under ISO 22197-1:2007 conditions.

In one embodiment the photocatalytic particle has an anatase fraction as measured by XRD in the range 25-80% before any optional post-treatment. The post treatment at elevated temperature may alter this anatase fraction and thus the anatase fraction should be measured before any optional post treatment at elevated temperature.

The particles can be present in various environments, where examples include dispersed in a liquid and dried as a powder.

The $TiO_2$ particles comprises at least one core with a crystalline anatase structure, a first layer is at least partly surrounding the core, and the first layer comprising at least one from $TiO_2$, $TiO_{(2-x)}$, and $TiO_2*H_2O$, said first layer is partly ordered, said first layer comprising parts where molecules are aligned with an imaginary extension of the crystal planes of the core, the first layer is in close contact with a second outer layer, at least partly enclosing the first layer and the core. The second layer comprises one from layered titanium dioxide and titanium dioxide both in $TiO_2$ (B)-form, said second layer is partly ordered, and said second layer comprising sheets aligned with crystal planes transversal to the outer surface of said particle.

In a second aspect there is provided a method of manufacturing a photocatalytic particle, said method comprising the steps of:
a) providing at least one titanic acid with the general formula $[TiO_x(OH)_{4-2x}]_n$ and soluble in at least one selected from the group consisting of $TiOCl_2$, $TiCl_4$, and HCl, and dissolving it in a solution comprising at least one selected from the group consisting of $TiOCl_2$, $TiCl_4$, and HCl, wherein the pH of the solution is lower than 1,
b) optionally adding at least one crystal habit modifier,
c) heating to a temperature in the interval 68-85° C., wherein the heating is performed with at least 0.3° C./min,
d) holding the temperature in the temperature 68-85° C. interval during 1-180 minutes, during stirring,
e) cooling to obtain a dispersion comprising particles with at least one core, said at least one core comprising anatase, and said at least one core having a crystal structure with crystal planes, said at least one core being in close contact with a first layer, said first layer is at least partly surrounding said at least one core, said first layer comprising at least one selected from the group consisting of $TiO_2$, $TiO_{(2-x)}$, and $TiO_2*H_2O$, said first layer is partly ordered, said first layer comprising parts where molecules are aligned with an imaginary extension of the crystal planes of said at least one core,
f) treating the dispersion to increase or decrease the content of ions, and adjusting the pH to a value in the range from 0.5 to 2.5, in order to add to the particles a second layer comprising at least one selected from the group consisting of layered titanium dioxide, and titanium dioxide in $TiO_2$ (B)-form, said second layer is partly ordered, and said second layer comprising sheets aligned with crystal planes transversal to the outer surface of said particle.

The amount of amorphous material in solution is a function of cooking time. I.e. more amorphous in solution with less cooking time, i.e. step d). This can be seen in experiments where step d) is stopped at various stages, washed and then dried. There is a distinct increase in non-anatase based $TiO_2$ or Ti containing phase with the time in step d).

Figure 4:
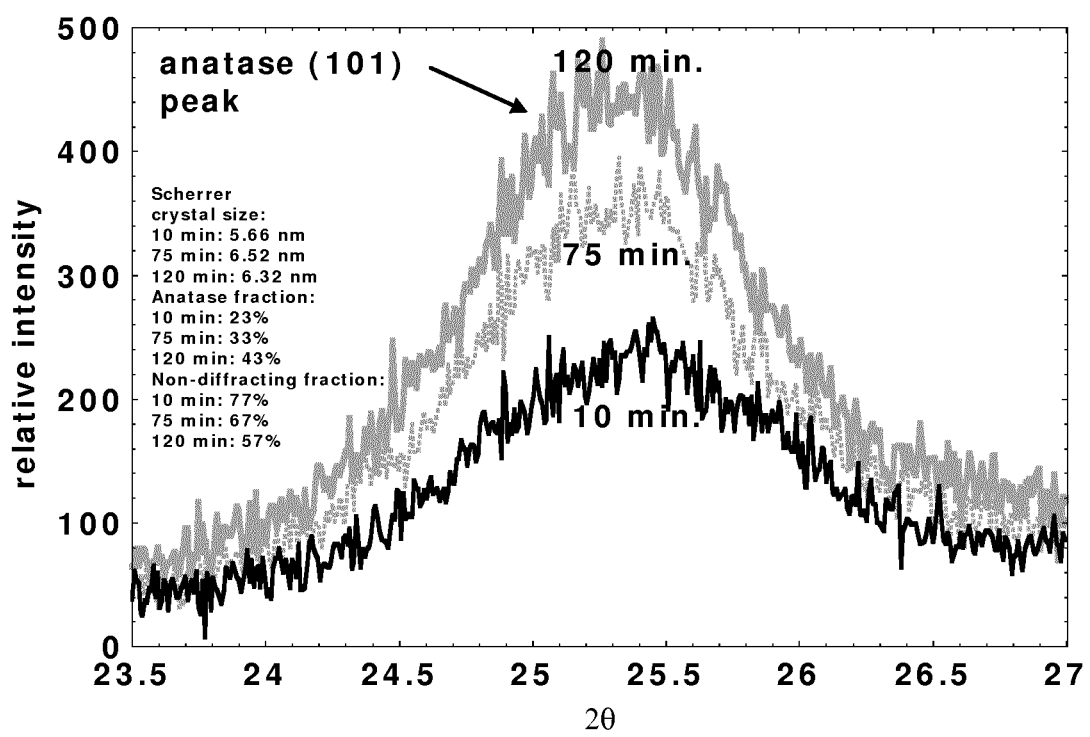
FIG. 4 shows an X-ray diffraction (XRD) pattern of the relative intensity of products made using different reaction times in step d).

FIG. 4 shows X-ray diffraction (XRD) patterns of the relative intensity of products made using different reaction times in step d). The lower curve represents 10 minutes reaction; the middle curve represents 75 minutes reaction time; and the upper curve represents 120 minutes reaction time. The XRD patterns are normalized by an internal standard mixed in a ratio of 1:1. This normalization allows direct assessment of the relative crystalline fraction of each sample. In this case the area under the curve between 23.5°-27° is taken as the relative crystallinity. It is very clear that the degree of non-anatase $TiO_2$ increases with decreased reaction time. FWHMs: 120 min. 1.14°; 75 min. 1.15°; 10 min. 1.25°.

This amorphous material apparently becomes a layered titania or disordered $TiO_2(B)$ Bronze phase after washing/reducing ionic strength (and drying) in the subsequent steps e)-f). This can also be seen in the increased crystallinity of materials reacted in solution for a longer or shorter time. It is also seen in the decrease in BET surface area consistent with a larger primary crystallite size.

Of importance regarding the formation of the second layer is the fact that the amorphous material is then deposited onto the formed crystallites during a post reaction reduction in the pH/salt content/ionic strength for which nanofiltration (NF) is used in one embodiment. Without being held to theory, the inventors believe that the reduction in pH/salt content/ionic strength during NF causes the precipitation of the separate amorphous phase onto secondary ca. 20 nm aggregates of anatase in a manner such that the amorphous material can both infill to some extent the gaps between the primary 5 nm crystallites comprising the said 20 nm secondary particle, and also form a partial or complete coat around the said secondary aggregates.

The proof that the amorphous phase exists in solution at the end of the crystallization step is supported by the fact that Ostwald ripening is not in place at 75 minutes and the fact that after 120 minutes the particles are bigger and more crystalline, therefore there must be amorphous material in the solution.

In one embodiment the temperature is held during 1-60 minutes during step d). In an alternative embodiment the temperature is held during 1-45 minutes during step d). In yet an alternative embodiment the temperature is held during 1-30 minutes during step d). In a further embodiment the temperature is held during 1-20 minutes during step d). In a still further embodiment the temperature is held during 1-15 minutes during step d). In yet another embodiment the temperature is held during 1-10 minutes during step d).

In one embodiment the at least one titanic acid with the general formula $[TiO_x(OH)_{4-2}x]n$ in step a) is provided by increasing the pH of at least one solution comprising at least one selected from the group consisting of $TiOCl_2$, and $TiCl_4$.

In one embodiment the at least one titanic acid with the general formula $[TiOx(OH)4_{-2}x]n$ in step a) is provided by increasing the pH of at least one solution comprising at least one selected from the group consisting of $TiOSO_4$, and $Ti_2SO_4$.

In one embodiment the titanium dioxide in step a) is provided as a precipitate which is recovered and washed.

In one embodiment the dissolving in step a) is performed with in a solution comprising from 10 to 40 wt % of the at least one selected from the group consisting of $TiOCl_2$, and $TiCl_4$, calculated by weight on the final mixture.

In one embodiment the dissolving in step a) is performed with in a solution comprising from 10 to 30 wt % HCl, calculated by weight on the final mixture.

In one embodiment the crystal habit modifier in optional step b) is citric acid.

It is preferred that a certain rate of heating is used. If the heating rate is lower the structure will become different. In one embodiment the heating in step c) is performed with at least 0.4° C./min. In one embodiment the heating in step c) is performed at a rate in the interval 0.5-2° C./min. In an alternative embodiment the heating in step c) is performed with at least 1° C./min.

A fast cooling is preferred. In one embodiment the cooling in step e) is performed with at least 1.5° C./min.

In one embodiment the cooling in step e) is performed to a temperature below 50° C.

In one embodiment step f) comprises nanofiltration. During the nanofiltration step the pH is increased and the amount of ions is reduced. The amount of ions should in step f) either be increased or decreased. Nanofiltration is one way of decreasing the content of ions. A way of increasing the ions is to add ions for instance adding a salt. In one embodiment the amount of ions is decreased in step f). Increase of ions means salt added to the final solution, such that during nanofiltration to a desired pH yields a solution of higher ionic strength compared to the product obtained after said NF without additional salt. In this way, and without being held to theory, the inventors believe that this will change the quality and structure of the amorphous layer precipitated during the change of the content of the ions in step f).

As an alternative to decreasing or increasing the concentration of ions in step f) it is possible to increase the pH and/or add more titania precursor, i.e. adding at least one selected from $TiOCl_2$, and $TiCl_4$.

In one embodiment at least one of the steps selected from the group consisting of filtering, washing, drying, and heat treatment, is performed after step f).

In one embodiment more than one washing and drying step is performed after step f). In one embodiment at least one of the steps selected from the group consisting of filtering, washing, and drying, is performed after step f). In one embodiment more than one washing and drying step is performed after step f).

In one embodiment a powder is made of the particles resulting from step f). In one embodiment a powder is made of the particles resulting from step f).

In one embodiment a post-treatment step is performed at elevated temperature in air. In one embodiment at least one post-treatment step is carried out after step f) at a temperature of at least 200° C. In an alternative embodiment the temperature is in the interval 200-300° C. In one embodiment the at least one post-treatment step is carried out after step f) during at least 10 hours. In one embodiment the drying step is carried out during 10-20 hours. The post-treatment step at elevated temperature will at least to some extent remove organic residues. The inventors believe that it also has an effect on the layered phase.

In one embodiment at least the steps a)-e) are performed in a stirred tank reactor.

When the compound is neutralized a precipitate is formed which can be isolated and washed.

In one embodiment the titanium dioxide in step a) is provided as a precipitate which is recovered and washed.

A crystal habit modifier improves the yield and will improve the photocatalytic particle properties. In one embodiment the crystal habit modifier in optional step b) is citric acid.

The time during which the dispersion is held at the high temperature during step d) affects the relative proportions of the crystalline core, the first layer and the second layer of the particles. It is thus possible to fine tune the proportions of these parts by varying the time.

After step f) a stable and almost transparent dispersion is obtained. The dispersion is stable (or rather metastable) at room temperature for extended periods.

Other features and uses of the invention and their associated advantages will be evident to a person skilled in the art upon reading the description and the examples.

It is to be understood that this invention is not limited to the particular embodiments shown here. The embodiments are provided for illustrative purposes and are not intended to limit the scope of the invention since the scope of the present invention is limited only by the appended claims and equivalents thereof.

Examples 98 kg of commercial titanium oxy chloride and 49 kg of water were neutralized with 417 kg of NaOH solution, forming a white precipitate. 7 kg of citric acid and another 229 kg of titanium oxy chloride were added to the product, thereby bringing pH below 0 and re-dissolving the precipitate. 7 kg of acetyl acetone were added and the mixture was heated controllably to about 70° C. at around 1° C./minute until a visible precipitate again started forming, at which point heating was stopped and temperature kept constant for 75 minutes before being cooled down.

Acid was removed from the resulting mixture to bring the pH to 1, which redispersed the precipitate and produced a visually transparent end product. Samples of this end product were neutralized, washed and dried to produce powder. Powder material was made from the acidic dispersion by neutralization to obtain a precipitate that was then filtered and dried.

Parts of the obtained washed and dried powder was heated to 250° C. for 18 hours in air in a post-treatment step.

The resulting powder was analysed by TEM, Raman, XRD and by ISO 22197. The NOx removal rate measured according to the relevant ISO standard was very high. The XRD and Raman show a fraction of amorphous or layered titanate in addition to anatase.

Figure 5:
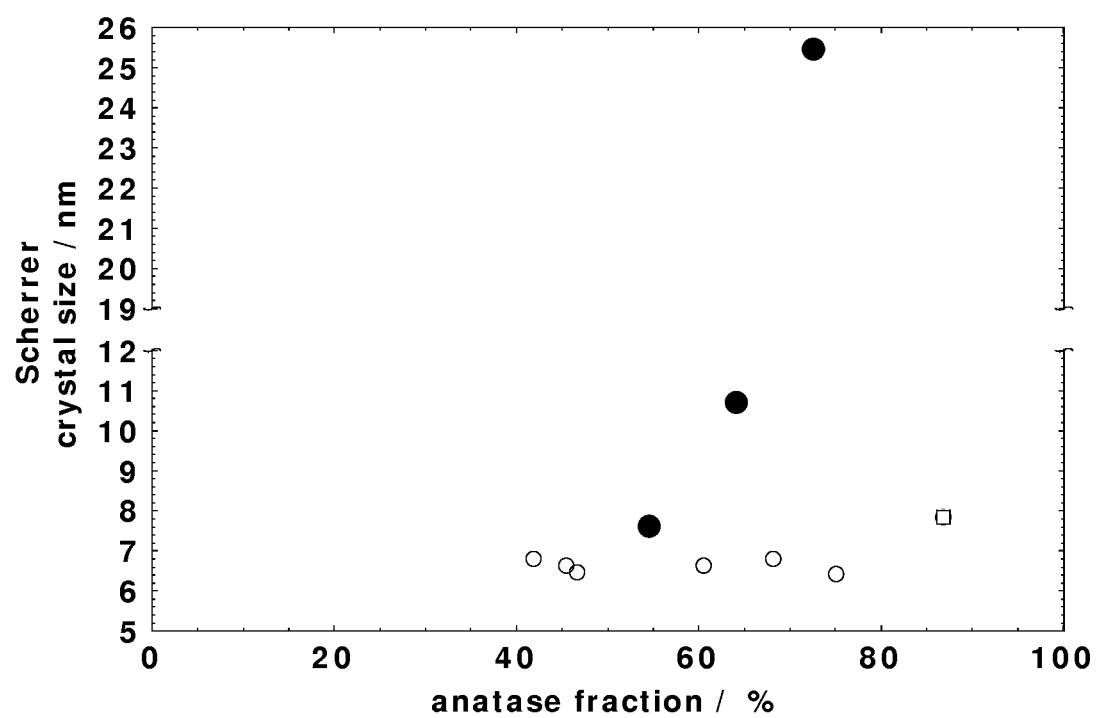
FIG. 5 shows the anatase fraction of the powder versus the Scherrer crystal size. Open circles are powders made according to the claimed method. Open square is a powder made according to the claimed method with heating to 250° C. for 18 hours in air. The black circles are Evonik P25, Millenium PC500 and Tayca. The percentages are by weight.

The anatase fraction in FIG. 5 was determined by X-ray diffraction according to the method of Jensen et al. Journal of Nanoparticle Research 6: 519-526, 2004.

Scherrer crystal size is here defined by the well known Scherrer equation, where the XRD input data used is the wavelength of radiation (here Cu Kalpha), the FWHM of the (011) peak of anatase, the instrumental broadening, the 2theta position of the peak maxima and B=0.9 for the shape factor.

We define selectivity for a given sample as the ratio of deNOx to deNO obtained by measuring a sample under ISO 22197-1:2007 setup and standard conditions (geometry, gas inflow composition and flow rate, humidity and light source).

FIG. 3 shows the removal of NOx of the sample. Open circles made according to the example, and open square with the additional post-treatment heating. Without being held to theory we believe the higher selectivity evident from the slope of the graph of NO vs NOx for samples obtained according to the claimed method versus others is due to a complete or incomplete thin surface layer of poorly ordered anatase/layered titania/bronze phase that is relatively adsorptive to $NO_2$ compared with crystalline anatase, but in sufficiently close association with the underlying crystalline anatase so as to not be a significant contributor to electron-hole recombination not a significant barrier for radical transport. We also believe that adsorbed water in this thin layer contributes to the source of radicals formed from either H or O or both in close vicinity to the adsorbed NO or NOx species to be photocatalytically converted to nitrates.

Figure 2:
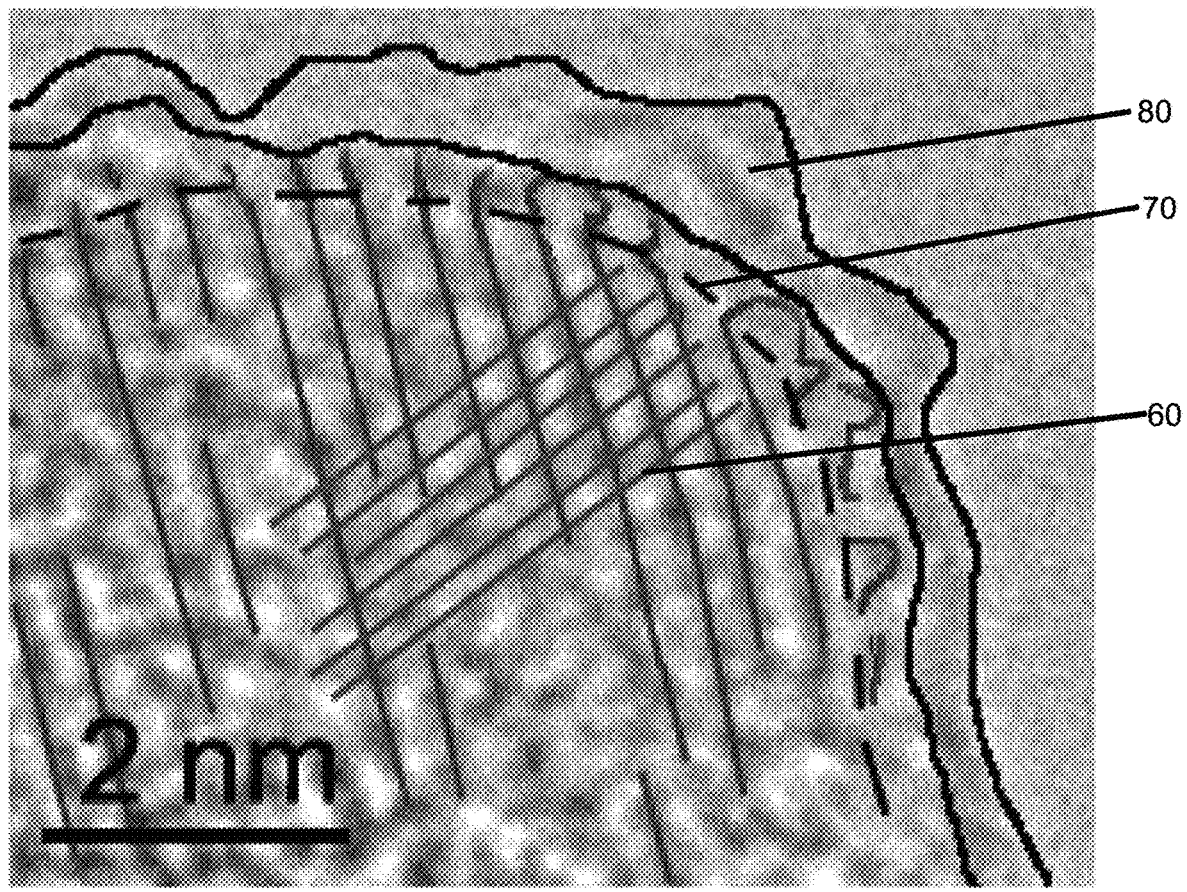
FIG. 2 shows an electron micrograph. As for FIG. 1, except some black lines 60 now represent atomic lattice planes within an individual anatase crystal. Towards the edges of the crystal (beyond the dashed black line 70) these become less ordered and change direction relative to the more ordered internal lattice planes further from the surface. The outer two black lines delineate the region 80 of titania skin overlying the anatase crystal below. Some of the lattice planes appear to be discontinuous in the lower part of the image but this is likely an artifact of other titania overlapping this crystal above or below the focal plane. The lattice planes seen here are the: (011) (3.5-3.6 Å) and (112 or 004 or 013) (2.4-2.5 Å) Miller planes of anatase.

Electron micrographs from the resulting particles are depicted in FIGS. 1 and 2.

The invention claimed is:

1. A photocatalytic particle comprising more than one core, said cores comprising $TiO_2$ and having a crystal structure with crystal planes, said cores comprising anatase, said cores being in close contact with a first layer, said first layer at least partly surrounding said cores, said first layer comprising at least one selected from the group consisting of $TiO_2$, $TiO_{(2-x)}$, and $TiO_2*H_2O$, said first layer being partly ordered, said first layer comprising parts where molecules are aligned with an imaginary extension of the crystal planes of said cores, wherein said first layer is in close contact with a second layer, said second layer is an outer layer, said second layer is at least partly enclosing said first layer including said cores, said second layer comprises at least one selected from the group consisting of layered titanium dioxide and titanium dioxide in $TiO_2$ (B)-form, said second layer is partly ordered, and said second layer comprises sheets aligned with crystal planes transversal to the outer surface of said particle.

2. The photocatalytic particle according to claim 1, wherein the thickness of said first layer is from 0.2 to 20 nm.

3. The photocatalytic particle according to claim 1, wherein the thickness of said first layer is from 0.4 to 5 nm.

4. The photocatalytic particle according to claim 1, wherein the thickness of said second layer is from 0.2 to 40 nm.

5. The photocatalytic particle according to claim 1, wherein the thickness of said second layer is from 0.3 to 10 nm.

6. The photocatalytic particle according to claim 1, wherein the photocatalytic particle comprises at least one selected from the group consisting of citric acid and a citrate.

7. The photocatalytic particle according to claim 1, wherein the photocatalytic particle is post-treated after drying at a temperature of 200-300° C. during 10-20 hours.

8. The photocatalytic particle according to claim 1, wherein the photocatalytic particle comprises at least one crystallite with a Scherrer crystallite size in the range 5.0-7.5 nm before any optional post-treatment.

9. The photocatalytic particle according to claim 1, wherein the photocatalytic particle has a NOx/NO selectivity above 60% under ISO 22197-1:2007 conditions.

10. The photocatalytic particle according to claim 1, wherein the photocatalytic particle has an anatase fraction as measured by XRD in the range 25-80% before any optional post-treatment.

11. A method of manufacturing a photocatalytic particle, said method comprising the steps of:
 a) providing at least one titanic acid with the general formula $TiO_x(OH)_{4-2x}$, where x is 0 or 1, and soluble in at least one selected from the group consisting of $TiOCl_2$, $TiCl_4$, and HCl, and dissolving the titanic acid in a solution comprising at least one selected from the group consisting of $TiOCl_2$, $TiCl_4$, and HCl, wherein the pH of the solution is lower than 1,
 b) optionally adding at least one crystal habit modifier,
 c) heating to a temperature in the interval 68-85° C., wherein the heating is performed at a rate of at least 0.3° C./min,
 d) holding the temperature in the temperature 68-85° C. interval during 1-180 minutes, during stirring,
 e) cooling to obtain a dispersion comprising particles with more than one core, said cores comprising anatase, having a crystal structure with crystal planes, and being in close contact with a first layer, said first layer at least partly surrounding said cores, said first layer comprising at least one selected from the group consisting of $TiO_2$, $TiO_{(2-x)}$, and $TiO_2*H_2O$, said first layer being partly ordered, and said first layer comprising parts where molecules are aligned with an imaginary extension of the crystal planes of said at least one core,
 f) treating the dispersion to decrease the content of ions, and adjusting the pH to a value in the range from 0.5 to 2.5, in order to add to the particles a second layer comprising at least one selected from the group consisting of layered titanium dioxide, and titanium dioxide in $TiO_2$ (B)-form, said second layer being partly ordered, and said second layer comprising sheets aligned with crystal planes transversal to the outer surface of said particle.

12. The method according to claim 11, wherein the at least one titanic acid in step a) is provided by increasing the pH of at least one solution comprising at least one selected from the group consisting of $TiOCl_2$, and $TiCl_4$.

13. The method according to claim 11, wherein the at least one titanic acid in step a) is provided by increasing the pH of at least one solution comprising at least one selected from the group consisting of $TiOSO_4$, and $Ti_2SO_4$.

14. The method according to claim 11, wherein the titanic acid in step a) is provided as a precipitate which is recovered and washed.

15. The method according to claim 11, wherein the dissolving in step a) is performed with in a solution comprising from 10 to 40 wt % of the at least one selected from the group consisting of $TiOCl_2$, and $TiCl_4$, calculated by weight on the final mixture.

16. The method according to claim 11, wherein the dissolving in step a) is performed with in a solution comprising from 10 to 30 wt % HCl, calculated by weight on the final mixture.

17. The method according to claim 11, wherein the crystal habit modifier in optional step b) is citric acid.

18. The method according to claim 11, wherein the heating in step c) is performed at a rate of at least 0.5° C./min.

19. The method according to claim 11, wherein the temperature is held during 1-45 minutes during step d).

20. The method according to claim 11, wherein the cooling in step e) is performed at a rate of at least 1.5° C./min.

21. The method according to claim 11, wherein the cooling in step e) is performed to a temperature below 50° C.

22. The method according to claim 11, wherein the content of ions is decreased in step f) by removing acid from the dispersion.

23. The method according to claim 11, wherein step f) comprises nanofiltration.

24. The method according to claim 11, wherein at least one of the steps selected from the group consisting of filtering, washing, drying, and heat treatment, is performed after step f).

25. The method according to claim 11, wherein more than one washing and drying step is performed after step f).

26. The method according to claim 11, wherein a powder is made of the particles resulting from step f).

27. The method according to claim 11, wherein at least the steps a)-e) are performed in a stirred tank reactor.

28. The method according to claim 11, wherein at least one post treatment step is carried out after step f) at a temperature of at least 200° C.

29. The method according to claim 11, wherein at least one post treatment step is carried out after step f) during at least 10 hours.

* * * * *

UNITED STATES PATENT AND TRADEMARK OFFICE
CERTIFICATE OF CORRECTION

| | |
|---|---|
| PATENT NO. | : 10,758,891 B2 |
| APPLICATION NO. | : 15/735083 |
| DATED | : September 1, 2020 |
| INVENTOR(S) | : Robert Corkery et al. |

Page 1 of 1

It is certified that error appears in the above-identified patent and that said Letters Patent is hereby corrected as shown below:

On the Title Page

Item (30), change "1550806" to --1550806-2--.

Signed and Sealed this
Seventeenth Day of November, 2020

Andrei Iancu
*Director of the United States Patent and Trademark Office*